United States Patent
Shiba et al.

(10) Patent No.: US 11,643,100 B2
(45) Date of Patent: May 9, 2023

(54) IN-VEHICLE DISPLAY APPARATUS

(71) Applicant: HONDA MOTOR CO., LTD., Tokyo (JP)

(72) Inventors: Genta Shiba, Wako (JP); Koji Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 192 days.

(21) Appl. No.: 17/160,858

(22) Filed: Jan. 28, 2021

(65) Prior Publication Data
US 2021/0237754 A1    Aug. 5, 2021

(30) Foreign Application Priority Data
Jan. 30, 2020   (JP) .............................. JP2020-013396

(51) Int. Cl.
| | | |
|---|---|---|
| B60W 50/08 | (2020.01) | |
| G08G 1/0967 | (2006.01) | |
| B60W 50/14 | (2020.01) | |
| B60W 60/00 | (2020.01) | |

(52) U.S. Cl.
CPC .......... B60W 50/085 (2013.01); B60W 50/14 (2013.01); B60W 60/0051 (2020.02); G08G 1/0967 (2013.01); *B60W 2050/146* (2013.01)

(58) Field of Classification Search
CPC combination set(s) only.
See application file for complete search history.

(56) References Cited

U.S. PATENT DOCUMENTS

| | | | |
|---|---|---|---|
| 11,077,862 B2 | 8/2021 | Mimura et al. | |
| 2011/0163864 A1 | 7/2011 | Watanabe et al. | |
| 2019/0149607 A1* | 5/2019 | Shim .................. | B60Q 3/14 307/10.1 |

(Continued)

FOREIGN PATENT DOCUMENTS

| | | |
|---|---|---|
| JP | 2007-302028 A | 11/2007 |
| JP | 2010-030575 A | 2/2010 |

(Continued)

OTHER PUBLICATIONS

Office Action dated Sep. 21, 2021 issued over the corresponding Japanese Patent Application No. 2020-013396 with the English translation thereof.

*Primary Examiner* — Maceeh Anwari
(74) *Attorney, Agent, or Firm* — Carrier Shende & Associates, P.C.; Joseph P. Carrier; Jeffrey T. Gedeon (57) ABSTRACT

An in-vehicle display apparatus includes a display device and a display control section that causes information of a vehicle to be displayed as an image in the display device. The vehicle is capable of switching between a driving manipulation mode and a driving assistance mode. The display control section, in the driving manipulation mode, causes display to be performed in a driving manipulation display format, in which a speed meter image and a rotational speed meter image that indicate a physical quantity accompanying the drive force of the vehicle using an indicator and a parameter change with respect to the indicator are displayed. The display control section, in the driving assistance mode, causes display to be performed in a driving assistance display format, in which the speed meter image and the rotational speed meter image are deleted and a driving assistance image is displayed.

10 Claims, 6 Drawing Sheets

(56) References Cited

U.S. PATENT DOCUMENTS

2019/0204827 A1* 7/2019 Bhalla .................. B60W 50/14
2020/0339147 A1* 10/2020 Hayakawa ............ B60W 50/14

FOREIGN PATENT DOCUMENTS

| JP | 2017-128306 A | 7/2017 |
| JP | 2018-024349 A | 2/2018 |
| JP | 2018-203013 A | 12/2018 |

* cited by examiner

IN-VEHICLE DISPLAY APPARATUS

CROSS-REFERENCE TO RELATED APPLICATION

This application is based upon and claims the benefit of priority from Japanese Patent Application No. 2020-013396 filed on Jan. 30, 2020, the contents of which are incorporated herein by reference.

BACKGROUND OF THE INVENTION

Field of the Invention

The present invention relates to an in-vehicle display apparatus that displays vehicle information.

Description of the Related Art

In a vehicle such as a four-wheel automobile, a display (display device) that is long in a vehicle width direction is installed in a dashboard facing the driver's seat, in order to display information concerning drive force and the like while travelling (for example, see Japanese Laid-Open Patent Publication No. 2010-030575).

The in-vehicle display disclosed in Japanese Laid-Open Patent Publication No. 2010-030575 is capable of transitioning between a first display format for displaying an image of the vehicle speed and an image of the engine rotational speed, and a second display format in which the image of the vehicle speed and the image of the engine rotational speed are moved away from each other and a night view image with high priority is displayed between these images. Furthermore, the in-vehicle display apparatus displays the image of the vehicle speed and the image of the engine rotational speed as an analog display that simulates a conventional speedometer.

SUMMARY OF THE INVENTION

In the recent years, since driving assistance systems that automatically control the travelling of vehicles are being loaded in vehicles, there is a demand to display information concerning the driving assistance in a display device. Here, the driver does not operate the driving force while the driving assistance is being performed. Therefore, during the driving assistance, there is little need to present the analog display of the vehicle speed image and the engine rotational speed image, and there is a high possibility that the user would actually feel annoyed due to the analog display.

The present invention relates to technology for an in-vehicle display apparatus, and has the object of providing an in-vehicle display apparatus that can improve the comfort and convenience for a user by switching from a display format used during driving manipulation to a suitable display format when driving assistance is to be performed.

In order to achieve the aforementioned object, one aspect of the present invention is an in-vehicle display apparatus including a display device and a control section that causes information of a vehicle to be displayed as an image in the display device, wherein the vehicle is configured to switch between a driving manipulation mode, in which drive force of the vehicle is controlled based on a driving manipulation made by a driver, and a driving assistance mode, in which driving assistance is implemented to automatically control the drive force of the vehicle; the control section, in the driving manipulation mode, causes display to be performed in a driving manipulation display format, in which one or more first images that indicate a physical quantity accompanying the drive force of the vehicle using an indicator and a parameter change with respect to the indicator are displayed; and the control section, in the driving assistance mode, causes display to be performed in a driving assistance display format, in which the first images are deleted and a second image concerning the driving assistance is displayed.

By changing from the display format during driving manipulation to a suitable display format when the driving assistance is to be performed, the in-vehicle display apparatus described above can improve the comfort and convenience for a user.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Preferred embodiments of the present invention will be presented and described below with reference to the accompanying drawings.

Figure 1:
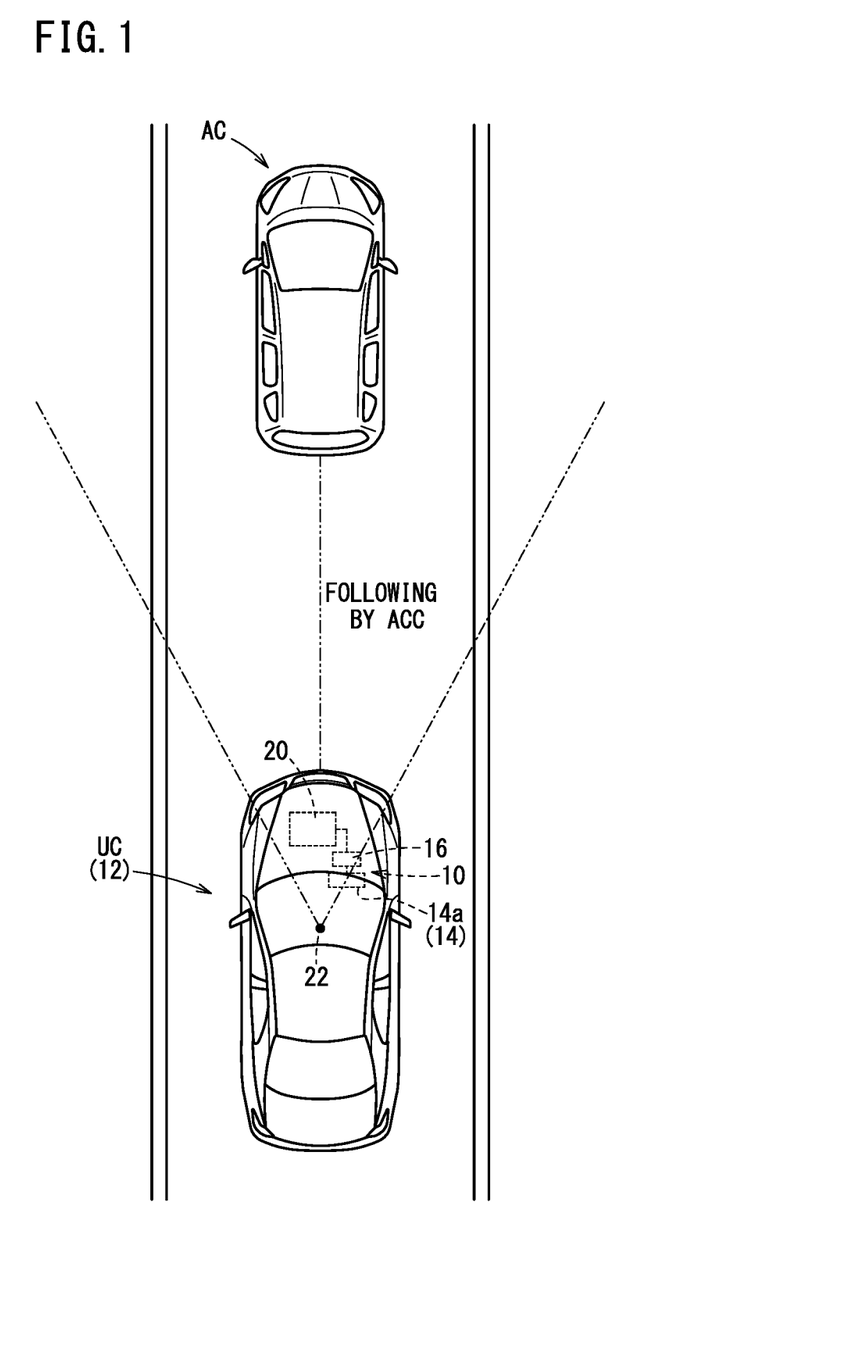
FIG. 1 is a descriptive diagram showing travel of a vehicle in which is loaded an in-vehicle display apparatus according to an embodiment of the present invention.

As shown in FIG. 1, an in-vehicle display apparatus 10 according to one embodiment of the present invention is loaded in a vehicle 12 such as a four-wheel automobile, and displays information concerning the vehicle 12 toward a driver (or another occupant) who is a user. This in-vehicle display apparatus 10 includes a display device 14 that actually performs the display and a display control section 16 (control section) that controls the display of the display device 14.

The vehicle 12 loaded in the in-vehicle display apparatus 10 operates in a driving manipulation mode, for controlling the drive force of the vehicle 12 based on driving manipulations made by the driver, and a driving assistance mode, for implementing driving assistance to automatically control the drive force of the vehicle 12. The transition between the driving manipulation mode and the driving assistance mode can be made by having the driver perform a mode switching operation, or by making a judgment on the vehicle 12 side according to the travelling environment of the vehicle 12, the state of the driver, or the like.

In the driving manipulation mode, the driver manipulates the accelerator and brake to operate a drive source (engine or motor) and braking apparatus (brake mechanism) (not shown in the drawings) of the vehicle 12, thereby adjusting the drive force to reflect the intention of the driver. Furthermore, the driver changes the steering angle of the vehicle wheels by steering a steering apparatus 18 (see FIG. 2), thereby adjusting the travel direction of the vehicle 12 to reflect the intention of the driver.

On the other hand, the driving assistance mode is a mode for automatically controlling the drive source, braking apparatus, steering apparatus 18, and the like with a driving assistance control section 20, in order to reduce the burden of performing manipulations by the driver when the vehicle 12 is travelling. For example, in the driving assistance mode, the vehicle 12 captures an image outside of the vehicle 12 with an imaging section 22 such as a camera, and controls the drive force of the vehicle 12 by calculating a speed or the like that is suitable for travel based on the captured image information of the imaging section 22.

As an example of the driving assistance mode, there is ACC (Adaptive Cruise Control) that, when another vehicle AC is travelling in front of the vehicle 12 (user vehicle UC) during travel, adjusts the speed to follow up the travelling of the other vehicle AC while maintaining a prescribed distance between the vehicle 12 and the other vehicle AC. Also, in the driving assistance mode, in addition to the ACC, an LKAS (Lane Keep Assist System) may be implemented to calculate a pair of lane lines based on the captured image information and adjust the steering in a manner to travel within the pair of lane lines (travel lane). Alternatively, the driving assistance mode may include automatic control (of level three or more) in which travel control performed by the driving assistance control section 20 is the main control and driving manipulations by the driver are sub controls.

The vehicle 12 that implements the driving assistance mode performs a preparation stage for setting the driving assistance mode when transitioning from the driving manipulation mode to the driving assistance mode. For example, when the ACC is performed in the driving assistance mode, an upper limit speed of the vehicle 12 is set by the driver in the preparation stage. Due to this, the driving assistance control section 20 performs control to adjust the speed such that the vehicle 12 does not exceed the set upper limit speed. That is, with the ACC, when another vehicle AC is travelling in front of the vehicle 12 (user vehicle UC), the other vehicle AC is marked (see the two-point dashed line in FIG. 1) and followed without having the speed of the vehicle 12 exceed the upper limit speed. On the other hand, if another vehicle AC is not travelling in front of the vehicle 12, the speed is controlled such that the vehicle 12 travels in the travel lane at the upper limit speed. The other vehicle AC that is the target of the ACC is not limited to a four-wheel automobile, and various types of vehicles that travel in travel lanes, such as motorcycles and trucks, can be the target of the ACC.

When the LKAS is performed in the driving assistance mode, in order to calculate the pair of lane lines (travelable range) necessary for the LKAS from the captured image information, a judgment is made concerning whether it is possible to stably recognize (acquire) the pair of lane lines from the captured image information in the preparation stage. Accordingly, when both the ACC and the LKAS are implemented, the driving assistance mode is transitioned to by performing both the setting of the upper limit speed and the lane line recognition (acquisition) in the preparation stage.

Therefore, the preparation stage of the driving assistance mode is a stage in which the driver has performed the operation to switch the mode, but the driving manipulation mode is still in effect and the driving assistance mode has not yet been implemented. In other words, in the driving manipulation mode, there is a main mode, in which the driver performs driving manipulations without performing the mode switching operation, and a transitional mode, which is a stage in which the driving assistance mode has not yet been transitioned to after the driver performs the mode switching operation.

Figure 2:
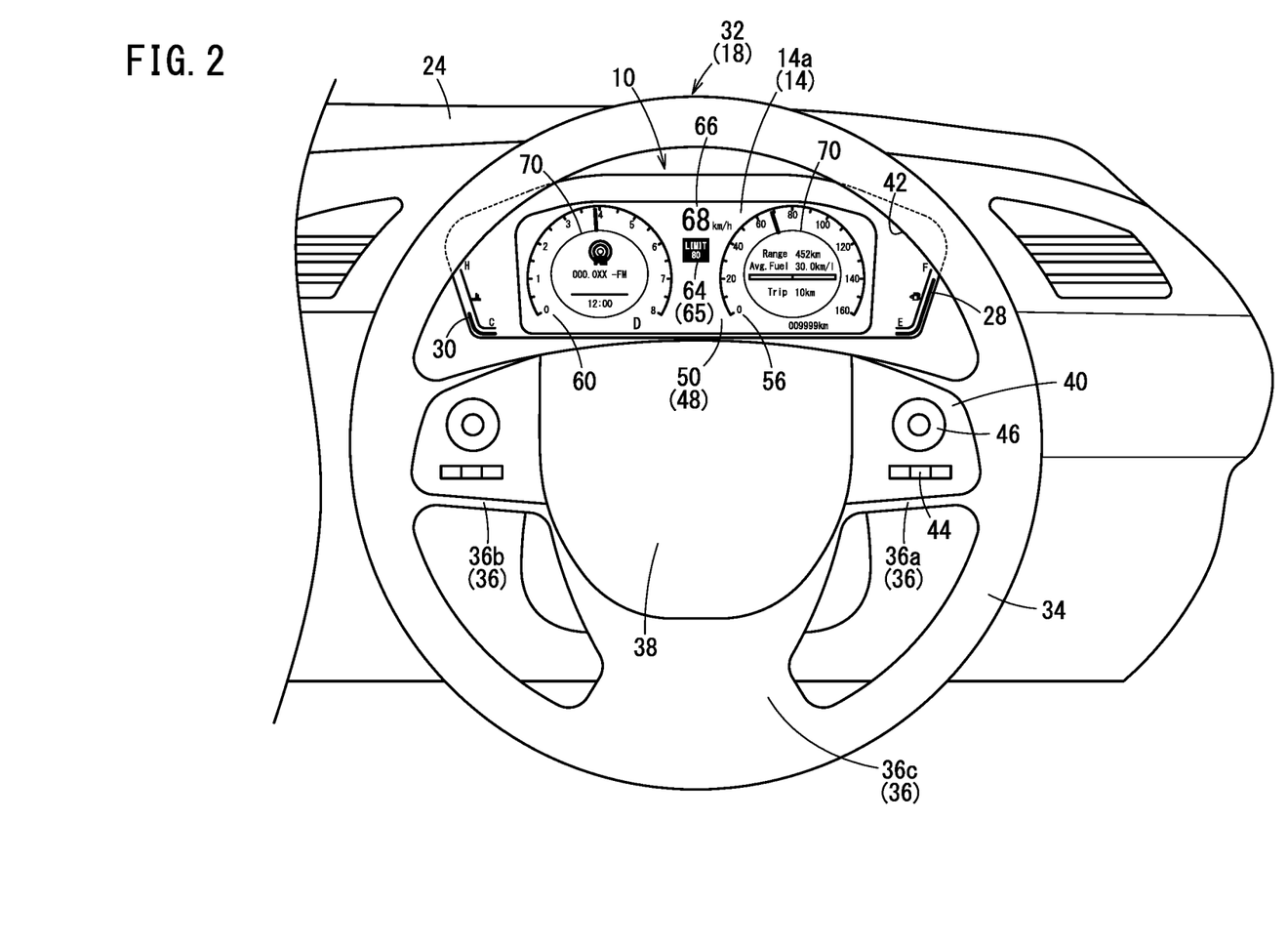
FIG. 2 is a descriptive diagram showing a state in which the in-vehicle display apparatus is installed in the vehicle.

As shown in FIG. 2, the in-vehicle display apparatus 10 loaded in the vehicle 12 described above provides the user with information concerning the drive force of the vehicle 12, via a display screen 14a of the display device 14 exposed in the vehicle cabin. The type of display screen 14a of the display device 14 is not particularly limited, as long as it can provide information to the driver, and a liquid crystal panel, an organic EL panel, or another type of display panel can be used. An HUD (Heads Up Display) that displays information in glasses, a projector that performs optical projection at a prescribed position, or the like may be provided in front of the driver, as the display device 14. Furthermore, the display device 14 may be formed as a touch panel that can be operated by the touch of riders in the vehicle 12.

The display device 14 is installed in a dashboard 24 (instrument panel) in front of the driver, such that the display screen 14a faces the driver. The display screen 14a of the display device 14 is not limited to just being in front of the driver, such as in the dashboard 24 or the windshield, and may be provided in a wide range in the vehicle width direction (the center portion in the vehicle width direction or in front of the passenger's seat).

The display screen 14a of the display device 14 is formed with a substantially rectangular shape that is long in the vehicle width direction. A fuel indicator 28 that indicates the remaining amount of fuel and battery power of the vehicle 12 is provided on one side (right side) outside of the display screen 14a in the vehicle width direction. A temperature indicator 30 that indicates the temperature of the drive source (water temperature of a cooling system) is provided on the other side (left side) outside of the display screen 14a in the vehicle width direction. These indicators or other indicators (warning indicator or the like) may instead be displayed within the display screen 14a.

A steering wheel 32 (manual manipulation portion of the steering apparatus 18) with which the driver steers the vehicle 12 is installed at a position slightly below the display device 14 of the dashboard 24. The steering wheel 32 includes a rim portion 34 that is formed to be ring-shaped and is gripped by the driver, a plurality (three in FIG. 2) of support portions 36 that extend from a radially inward side of the rim portion 34 toward the center portion, and a central connecting portion 38 that connects the plurality of support portions 36 at the central portion of the rim portion 34. The support portions 36 and the central connecting portion 38 are provided with a resin covering portion 40 that is connected integrally, and core portions (not shown in the drawings) of the support portions 36 and a top end portion of a steering shaft (not shown in the drawings) connected to the core portions of the support portions 36 are inserted inside this resin covering portion 40.

Furthermore, a grip sensor (not shown in the drawings) that detects the grip of the driver is provided on the rim portion 34. In order to quickly switch from the driving assistance mode to the driving manipulation mode, the driving assistance control section 20 basically has, as a condition for implementing the driving assistance mode, that the driver be gripping the rim portion 34.

The plurality of support portions 36 include a pair of lateral support portions 36a and 36b that extend from the central connecting portion 38 in the vehicle width direction and a lower support portion 36c that extends downward from the central connecting portion 38. A space 42 between these support portions 36a, 36b, the central connecting portion 38 and the rim portion 34 is formed with a substantially semi-circular shape (substantially crescent moon shape) above the pair of support portions 36a and 36b and the central connecting portion 38. This space 42 forms a portion through which the driver's line of sight passes when looking at the display screen 14a.

The steering wheel 32 according to the present embodiment includes a mode switching portion 44 by which the driver switches between the driving manipulation mode and the driving assistance mode described above. The mode switching portion 44 is formed as a push button, and is provided at a design portion on the resin covering portion 40. For example, the mode switching portion 44 is provided on one of the plurality of support portions 36 (the right-side lateral support portion 36a in FIG. 2). The driving assistance control section 20 implements the driving manipulation mode (main mode) in which the driver performs driving manipulations when the mode switching portion 44 is in the OFF state. When the mode switching portion 44 is turned ON by the driver in this main mode, the control section 20 changes the mode to the driving assistance mode via the transitional mode described above. The mode switching portion 44 is not limited to being a push button, and a scroll switch, electrostatic capacitance switch, or the like may be used instead.

Furthermore, the steering wheel 32 is provided with a speed setting operation portion 46 for setting the upper limit value of the speed for the driving assistance, in the transitional mode. The speed setting operation portion 46 of the present embodiment is formed by a cursor button farther upward than the mode switching portion 44.

The display control section 16 is arranged at a prescribed position in the vehicle body (e.g. in the dashboard 24), and is formed by a control substrate or control box connected to the display device 14 via a communication line (not shown in the drawings). The display control section 16 may be provided integrally (without using a communication line) with the display device 14 on the back surface side of the display device 14 (on the opposite side from the vehicle cabin).

The display control section 16 is formed by a computer that includes one or more processors, a memory, and an input/output interface (not shown in the drawings). The display control section 16 performs a display process for displaying the information of the vehicle 12 in a suitable display format, by having the processor execute a program (not shown in the drawings) stored in the memory. The display control section 16 generates screen information based on the information of the vehicle 12 input from a speed sensor, an encoder, or the like (none of which are shown in the drawings), via the input/output interface.

Furthermore, the display control section 16 includes a communication module (not shown in the drawings) for performing information communication with other in-vehicle devices (e.g. the imaging section 22 and driving assistance control section 20 described above, as well as other in-vehicle devices such as a navigation apparatus (not shown in the drawings)) loaded in the vehicle 12. The display control section 16 acquires information (e.g. information concerning signs on the road such as speed limits) needed for the display of the display device 14 from within the captured image information of the imaging section 22, and also acquires information concerning the driving assistance mode from the driving assistance control section 20. The information concerning the speed limit may be acquired from the navigation apparatus or the like, as information set on the road and obtained by detecting the road position on which the vehicle 12 is travelling.

Figure 3:
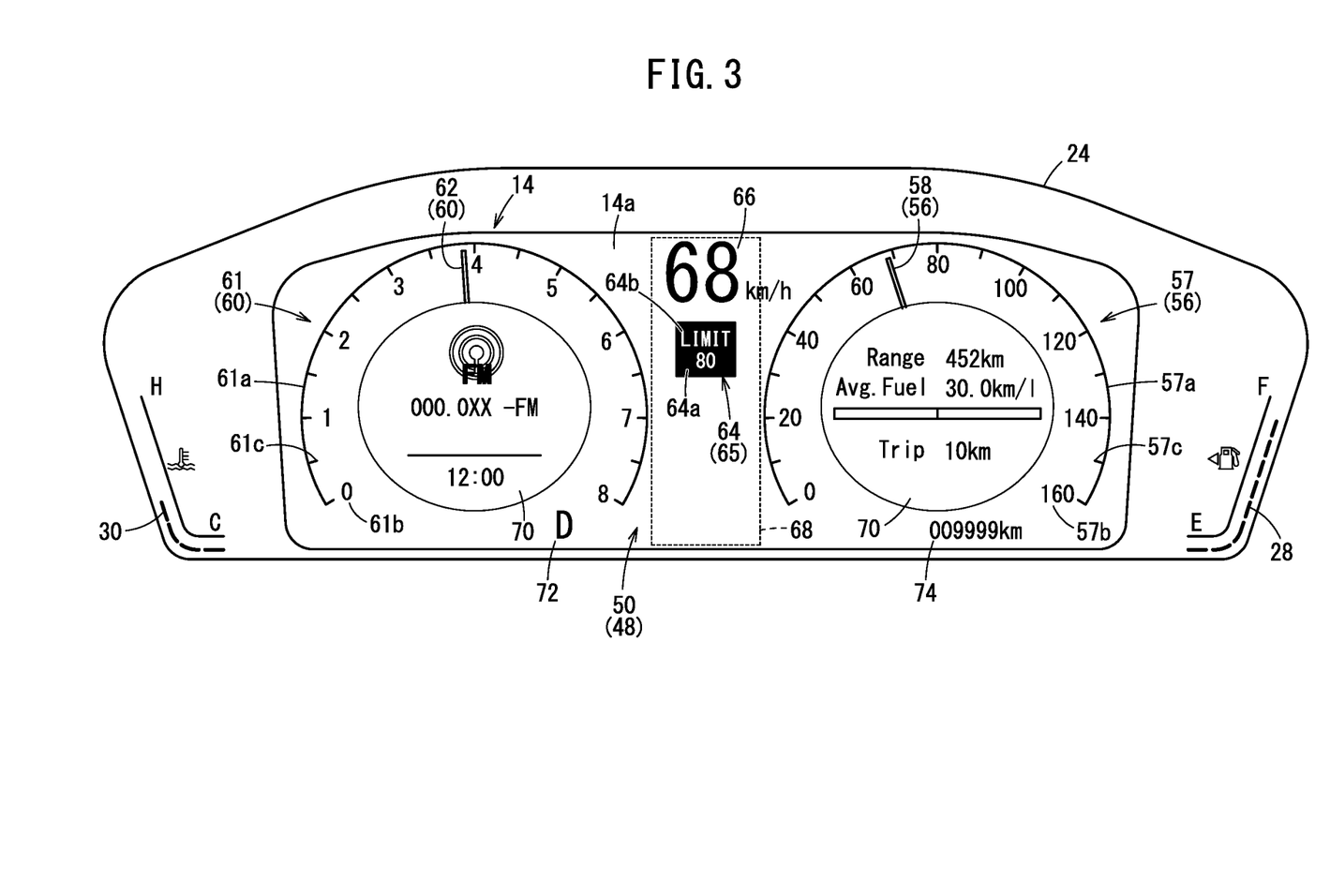
FIG. 3 is a front view of an example of a main display format displayed in the display device.

The following describes screen information of the display screen 14a generated by the display control section 16, while referencing FIG. 3. As described above, the vehicle 12 implements the driving manipulation mode (main mode and transitional mode) and the driving assistance mode. Therefore, the display control section 16 generates three display formats (a main display format 50, a transitional display format 52, and a driving assistance display format 54) as screen information that is displayed on the display screen 14a in the display device 14.

The main display format 50 is screen information in a driving manipulation display format 48 for providing the driver with information of the vehicle 12 necessary for travel (information concerning physical quantities that accompany the drive force, information concerning the speed limit, and the like), in the main mode. The physical quantities that accompany the drive force include the speed of the vehicle 12 and the rotational speed of the drive source, for example. Therefore, the main display format 50 has four types of image information (a speed meter image 56, a rotational speed meter image 60, a speed limit image 64, and a speed numerical value image 66), and these pieces of image information are arranged in a prescribed region of the display screen 14a to realize the main display format 50.

The speed meter image 56 is an image (first image) in which the travelling speed of the vehicle 12 (physical quantity accompanying the drive force of the vehicle 12) is displayed in an analog manner. Essentially, the image information displayed in the display screen 14a can be designed freely, but by having the speed meter image 56 and the rotational speed meter image 60 simulate a speedometer and a tachometer, it becomes easier to recognize the speed and the rotational speed.

More specifically, the speed meter image 56 is formed to include an arc-shaped speed indicator 57. For example, the speed indicator 57 is formed by uniformly assigning a prescribed range of speed (0 km/h to 160 km/h in the example of the drawing) to an arc-shaped circumferential-direction indicator line 57a. Furthermore, a main scale 57b having fixed values at each prescribed speed (every 20 km/h in the example of the drawing) and a sub scale 57c having short protrusions oriented radially inward at each prescribed speed (every 10 km/h in the example of the drawing) are formed on the arc-shaped circumferential-direction indicator line 57a.

Furthermore, the speed meter image 56 includes a speed needle 58 that moves relative to the speed indicator 57 based on the traveling speed of the vehicle 12. Essentially, the speed needle 58 is a display indicating a parameter change corresponding to a physical quantity that accompanies the drive force. This speed needle 58 simulates the needle of an analog speedometer, and has a shape in which the tip of the needle protrudes from a circular image 70 arranged inside the speed meter image 56. The speed needle 58 is configured such that a radially outward protruding end of the speed needle 58 moves in the circumferential direction along the speed indicator 57 near the circumferential-direction indicator line 57a.

The rotational speed meter image 60 is an image (first image) in which the rotational speed of the drive source (physical quantity accompanying the drive force of the vehicle 12) is displayed in an analog manner. Specifically, the rotational speed meter image 60 is formed to include an arc-shaped rotational speed indicator 61. For example, the rotational speed indicator 61 is formed by uniformly assigning a prescribed range of rotational speed (0 rpm to 8000 rpm in the example of the drawing) to an arc-shaped circumferential-direction indicator line 61a. Furthermore, a main scale 61b having fixed values at each prescribed rotational speed (every 1000 rpm in the example of the drawing) and a sub scale 61c having short protrusions oriented radially inward at each prescribed rotational speed (every 500 rpm in the example of the drawing) are formed on the arc-shaped circumferential-direction indicator line 61a.

Yet further, the rotational speed meter image 60 includes a rotational speed needle 62 that moves relative to the rotational speed indicator 61 based on the rotational speed of the drive source. Essentially, the rotational speed needle 62 is a display indicating a parameter change corresponding to a physical quantity that accompanies the drive force, and is shaped in the manner of an analog tachometer needle with a needle tip portion protruding from the circular image 70 arranged inside the rotational speed meter image 60.

The speed limit image 64 is a road sign image 65 (third image) notifying the driver of the speed limit of the road on which the vehicle 12 is travelling. The speed limit information is acquired from the imaging section 22 and the navigation apparatus, as described above. The speed limit image 64 has a background layer 64a made of a color (white) that is opposite the main background color (black) of the display screen 14a and numerical value information 64b shown by a color (e.g. black) other than the background color of the background layer 64a, so that the speed limit image 64 can be easily distinguished from the speed numerical value image 66. The sign image 65 is not limited to a speed limit image 64, and may display various types of signs such as temporary stop instructions and prohibited entry signs.

The speed limit image 64 does not need to be displayed in the main display format 50 (or the transitional display format 52 or driving assistance display format 54). Furthermore, the display control section 16 may perform control such that the speed limit image 64 is not displayed when there is no speed limit information and is displayed when there is speed limit information.

The speed numerical value image 66 is an image in which the travelling speed of the vehicle 12 (physical quantity that accompanies the drive force of the vehicle 12) is displayed digitally as a numerical value. Essentially, the specific speed of the vehicle 12 is provided to the driver by the display control section 16 displaying the speed information made up of a specific numerical value. Obviously, the speed numerical value image 66 also does not need to be displayed in the main display format 50 (or the transitional display format 52 or driving assistance display format 54).

In the main display format 50, the speed meter image 56 is arranged on the right side of the display screen 14a and the rotational speed meter image 60 is arranged on the left side of the display screen 14a. In this case, the speed meter image 56 and the rotational speed meter image 60 are formed to be symmetrical, by generating the speed indicator 57 and the rotational speed indicator 61 to have the same size. The arrangement positions of the speed meter image 56 and the rotational speed meter image 60 may be reversed.

In the main display format 50, the speed limit image 64 and the speed numerical value image 66 are arranged between the speed meter image 56 and the rotational speed meter image 60 (in a middle region 68 in the width direction of the display screen 14a). The middle region 68 is sufficiently smaller than the width of the speed indicator 57 and the rotational speed indicator 61 (the diameters of the circumferential-direction indicator lines 57a and 61a). For example, the width of the middle region 68 may be set to be in a range from ⅓ to ⅙ the diameter of the circumferential-direction indicator line 57a.

The speed numerical value image 66 and the speed limit image 64 are arranged above the center of the display screen 14a in the up-down direction. Furthermore, the speed numerical value image 66 is arranged farther upward than the speed limit image 64, and has a numerical display that is larger than that of the speed limit image 64.

Information other than the drive force of the vehicle 12 is suitably displayed in circular images 70 arranged inside the speed indicator 57 and the rotational speed indicator 61. For example, the information other than the drive force of the vehicle 12 is information such as the remaining fuel amount, fuel consumption, distance travelled, time, and music being played in the vehicle cabin (including content acquired via a network, a radio program, and the like). Furthermore, in the main display format 50, image information of the current shift lever position 72 and the cumulative travelled distance 74 is arranged below a pair of the circular images 70 (the speed meter image 56 and the rotational speed meter image 60). Obviously, these pieces of information may be arranged inside the circular images 70.

By arranging each image such as described above, the main display format 50 can provide the driver who is in the midst of making the driving manipulations in an easily-viewable manner, in which display of the physical quantities (speed and rotational speed) that accompany the drive force of the vehicle 12 follows a conventional display. Furthermore, due to the speed numerical value image 66 and the speed limit image 64 being arranged in the middle region 68, the main display format 50 can make it easy to find details about and make comparisons between the current speed and the speed limit, thereby improving the suitability of the driving manipulations made by the driver.

Figure 4:
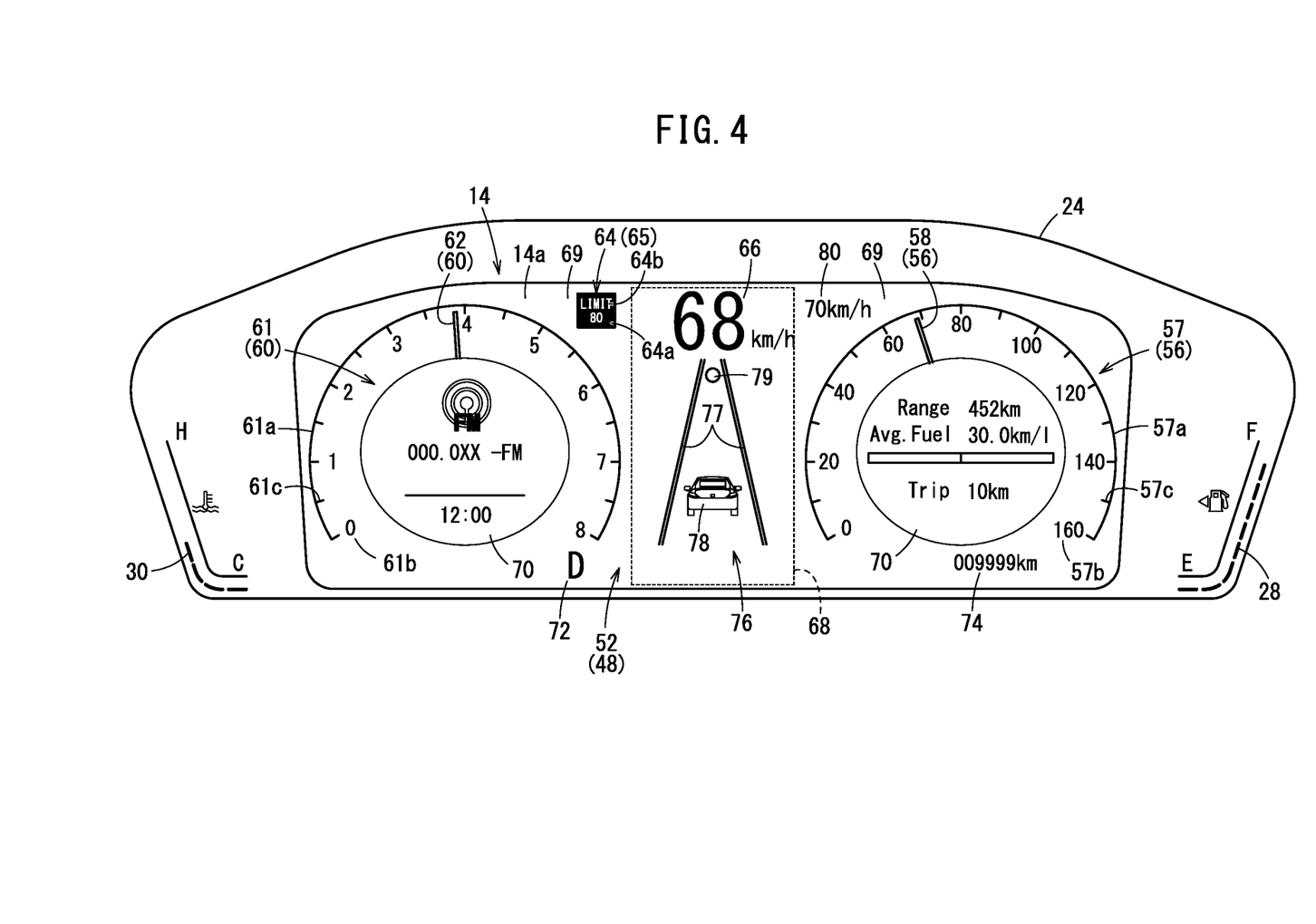
FIG. 4 is a front view of an example of a transitional display format displayed in the display device.

On the other hand, the transitional display format 52 is image information in the driving manipulation display format 48 providing the drive with information concerning driving assistance in addition to the information of the vehicle 12 needed for travel, in the transitional mode. Therefore, in the transitional display format 52, the information concerning the driving assistance is displayed along with the four types of information described above (the speed meter image 56, the rotational speed meter image 60, the speed limit image 64, and the speed numerical value image 66).

The information concerning the driving assistance is a driving assistance image 76 (second image) indicating the implementation state of the driving assistance mode (whether there is another vehicle AC ahead, whether the other vehicle AC is being followed up if the other vehicle AC is present, and whether the lane lines of the travel lane are recognized (acquired)), for example.

The driving assistance image 76 has a fine (thin) grid (not shown in the drawings) that has a three-dimensional depth, and displays a pair of schematic lane lines 77 that simulate the lane lines of the travel lane, a schematic user vehicle UC (schematic vehicle 78), and a schematic other vehicle AC (schematic other vehicle 79) together with each other. This driving assistance image 76 is formed to be vertically long in the up-down direction of the display screen 14a. The horizontal width of the driving assistance image 76 may be set in a range of approximately ⅙ to 1/10 of the width of the display screen 14a, for example.

The grid of the driving assistance image 76 is shaped to be inclined to approach the center, from the bottom side to the top side, to convey the impression of depth to the driver. The pair of schematic lane lines 77 are arranged along the grid to be inclined relative to each other such that the space between lane lines gradually narrows moving upward. Furthermore, the schematic user vehicle 78 is represented by a rear view of a vehicle and is arranged on the lower side between the pair of schematic lane lines 77. On the other hand, the schematic other vehicle 79 is represented by a simple spherical shape or the like and arranged on the top side between the pair of schematic lane lines 77.

In the driving assistance image 76, the space between the schematic user vehicle 78 and the schematic other vehicle 79 fluctuates (the schematic other vehicle 79 moves up and down relative to the schematic user vehicle 78) according to the actual distance between the vehicles. Furthermore, the driving assistance image 76 is configured such that the color of the schematic other vehicle 79 changes between a state in which the other vehicle AC is recognized (acquired) in order to follow up the other vehicle AC and a state where the other vehicle AC is not recognized. The driving assistance image 76 is further configured to, when the LKAS is performed in the driving assistance mode, change the color of the pair of schematic lane lines 77 between a state where the lane lines of the travel lane can be recognized based on the captured image information of the imaging section 22 and a state where the lane lines of the travel lane cannot be recognized. The function for staying in the travel lane (LKAS) may be capable of being implemented by recognizing just one of the lane lines in the pair. The driving assistance image 76 may be configured to display the one schematic lane line 77 that is recognized, when the LKAS is performed in a state where one of the lane lines is recognized or when it is necessary to recognize the pair of lane lines in the LKAS but only one lane line can be recognized.

The information concerning the driving assistance is the upper limit speed of the driving assistance mode set by the driver and expressed as a numerical value (referred to below as the upper limit value image 80) in the display screen 14a. The upper limit value image 80 is displayed to be smaller than the speed numerical value image 66.

The transitional display format 52 is displayed with its position and size significantly changed from the image in the main display format 50, in order to display the driving assistance image 76 described above while preventing discomfort in the view of the driver. Specifically, the speed meter image 56 and the rotational speed meter image 60 in the transitional display format 52 are slightly reduced in size, compared to the speed meter image 56 and the rotational speed meter image 60 in the main display format 50. Furthermore, the speed meter image 56 and the rotational speed meter image 60 in the transitional display format 52 are arranged at positions obtained by moving the speed meter image 56 and the rotational speed meter image 60 in the main display format 50 in the width direction. The circular images 70 are also reduced in size and moved outward in the width direction, in accordance with the reduction and movement outward in the width direction of the speed meter image 56 and the rotational speed meter image 60.

Therefore, the middle region 68 between the speed meter image 56 and the rotational speed meter image 60 in the transitional display format 52 becomes wider than the middle region 68 in the main display format 50. The sides of the middle region 68 in the transitional display format 52 are arranged overlapping the speed meter image 56 and the rotational speed meter image 60 in the main display format 50.

In the transitional display format 52, the speed numerical value image 66 and the driving assistance image 76 are arranged in this middle region 68. The driving assistance image 76 is arranged farther downward than the speed numerical value image 66, and formed to have a size in a range that is approximately ½ to ⅘ of the middle region 68 in the up-down direction. The speed numerical value image 66 in the transitional display format 52 has the same position and size as the speed numerical value image 66 in the main display format 50.

Empty regions 69 with substantially triangular shapes are formed by the arc-shaped speed meter image 56 and rotational speed meter image 60 at positions adjacent to the sides in the top portion of the middle region 68 (speed numerical value image 66). An upper limit value image 80, which is information concerning the driving assistance, is arranged in the empty region 69 on the right side of the middle region 68.

Furthermore, the speed limit image 64 is arranged in the empty region 69 on the left side of the middle region 68. The speed limit image 64 in the transitional display format 52 is deformed so as to be reduced in size from the size of the speed limit image 64 in the main display format 50. As described above, the speed limit image 64 is formed by the background layer 64a of the opposite color, to be easily distinguished from the upper limit value image 80 by the driver.

As described above, in the transitional display format 52, by arranging the driving assistance image 76 in the widened middle region 68, it is possible to easily inform the driver that preparation for the transition to the driving assistance mode has started. Furthermore, in the transitional display format 52, since the speed meter image 56 and the rotational speed meter image 60 are only slightly reduced in size, there is no interference with the driver checking the information concerning the drive force while performing the driving manipulations. Furthermore, by arranging the speed limit image 64 and the upper limit value image 80, which are small numerical value displays, near the speed numerical value image 66 without changing the size and position of the speed numerical value image 66, it is possible to easily set the upper limit value of the driving assistance mode.

Figure 5:
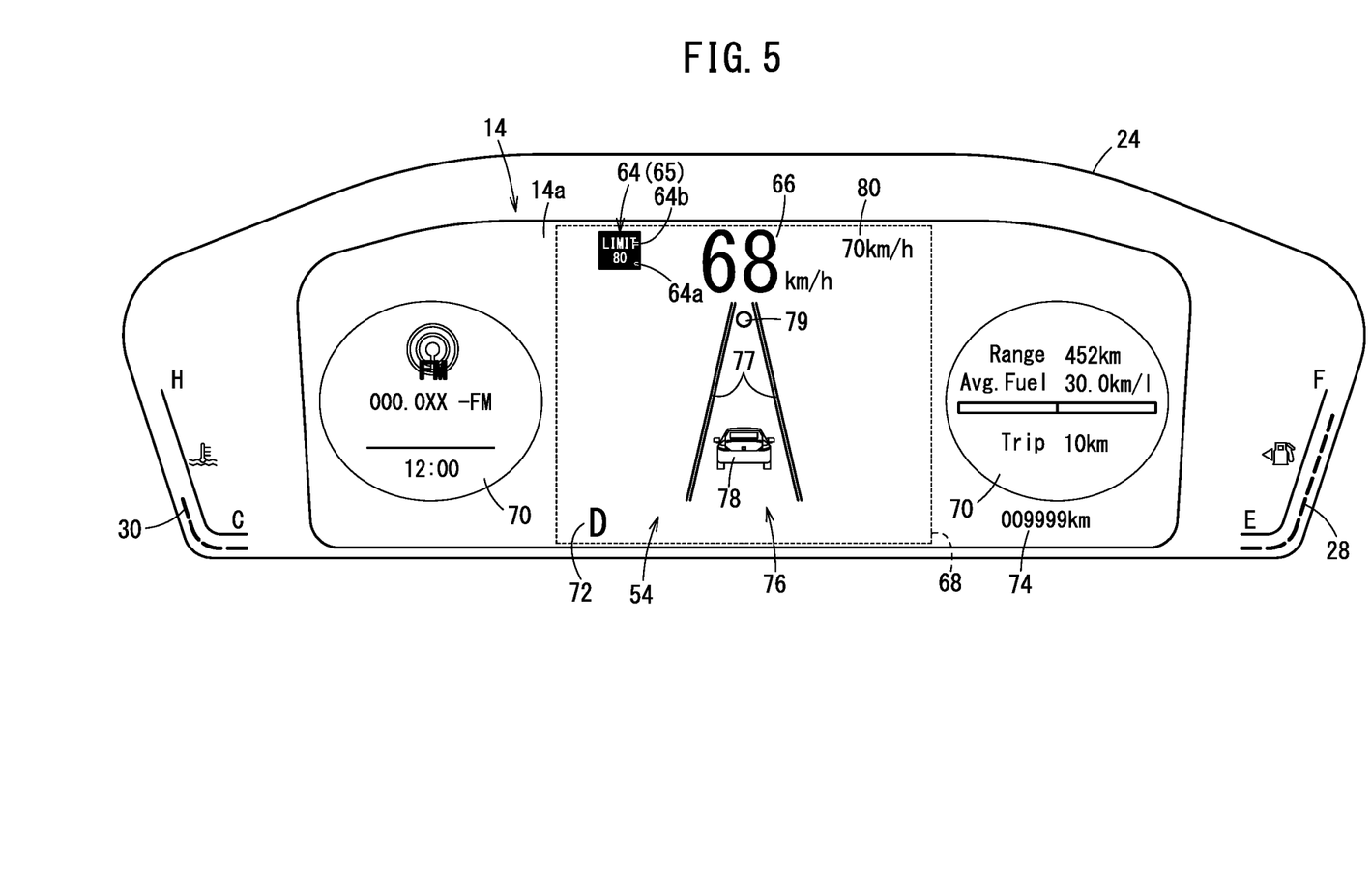
FIG. 5 is a front view of an example of a driving assistance display format displayed in the display device.

The driving assistance display format 54 provides the driver mainly with the information concerning the driving assistance. Here, in the driving assistance mode, since the driving assistance control section 20 of the vehicle 12 adjusts the drive force, the significance of providing the display of the physical quantities that accompany the drive force, to the driver who is not performing the driving manipulation is greatly reduced. Therefore, the driving assistance display format 54 according to the present embodiment displays the information concerning the driving assistance, but does not display the speed meter image 56 and the rotational speed meter image 60 (the information concerning the physical quantities in which the drive force is shown by indicators and the parameter changes with respect to the indicators).

Essentially, in the driving assistance display format 54, the speed meter image 56 and the rotational speed meter image 60 in the transitional display format 52 are deleted, and the other information that remains is displayed. For example, even when the speed meter image 56 and the rotational speed meter image 60 are deleted, the pair of circular images 70 arranged inside the speed indicator 57 and the rotational speed indicator 61 are still displayed, thereby providing information other than the drive force of the vehicle 12. In this case, in the driving assistance display format 54, an empty portion is created by deleting the speed indicator 57 and the rotational speed indicator 61, and therefore the pair of circular images 70 are arranged by being moved slightly outward in the width direction.

In the driving assistance display format 54, the speed numerical value image 66, the speed limit image 64, the driving assistance image 76, and the upper limit value image 80 are arranged in the middle region 68 that has been further widened in the width direction between the pair of circular images 70. The arrangement position of each image is the same as in the transitional display format 52. In the driving assistance display format 54, the speed numerical value image 66 may have its display content altered, such as by having an emphasized display, relative to the transitional display format 52. Examples of an emphasized display include changing the colors of characters (e.g. changing the color from black to red) and changing the size of characters (e.g. changing characters to be larger).

The driving assistance image 76 is in a state where the display range of the grid has been widened according to the change of the width of the middle region 68, without changing the shapes of the pair of schematic lane lines 77, the schematic user vehicle 78, and the schematic other vehicle 79. Due to this, even when transitioning from the transitional display format 52 to the driving assistance display format 54, the information concerning the driving assistance does not change, and the driver is prevented from feeling discomfort. The driving assistance image 76 may display various types of information needed for the driving assistance, in an expanded display range in the driving assistance display format 54. For example, the driving assistance image 76 may display, in addition to the travel lane of the user vehicle, the travel lanes, travelling vehicles, and the like adjacent to the user vehicle. At this time, by displaying the various types of information needed for the driving assistance in an added manner in the expanded display range in the driving assistance display format 54 without changing the content displayed in the transitional display format 52, it is possible to prevent the driver from feeling discomfort.

The in-vehicle display apparatus 10 according to the present embodiment is basically configured as described above, and the following describes the operations thereof.

As shown in FIG. 1, the vehicle 12 in which the in-vehicle display apparatus 10 is loaded operates in the driving manipulation mode in which the driver performs the driving manipulations and in the driving assistance mode in which driving of the vehicle 12 is assisted by the driving assistance control section 20 of the vehicle 12. The in-vehicle display apparatus 10 generates image information corresponding to each mode with the display control section 16, and displays this image information in the display screen 14*a* (display device 14) provided at a position facing the driver.

Figure 6:
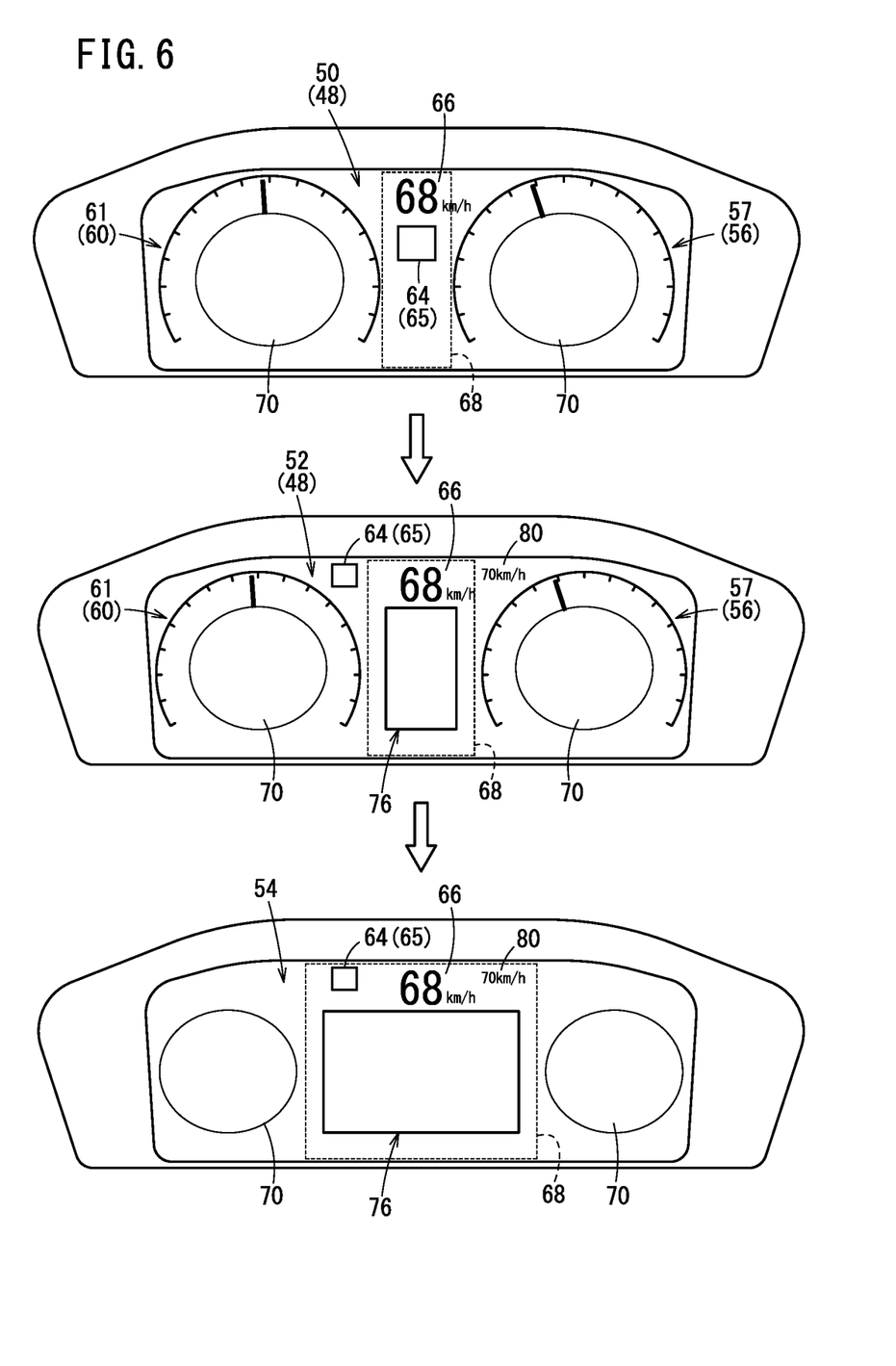
FIG. 6 is a descriptive diagram showing the change of each image that accompanies a transition of the display format.

When switching from the driving manipulation mode to the driving assistance mode is performed by the driver performing a mode switching operation of the mode switching portion 44, the driving assistance control section 20 transitions from the main mode that is currently being implemented to the driving assistance mode, via the transitional mode. Therefore, as shown in FIG. 6, the in-vehicle display apparatus 10 changes the image information in the display screen 14*a* in order of the main display format 50, the transitional display format 52, and the driving assistance display format 54.

The speed meter image 56 and the rotational speed meter image 60 (images of physical quantities that accompany the drive force of the vehicle 12) are arranged respectively on the right and left side, sandwiching the middle region 68 of the display screen 14*a*, in the main display format 50. The circular images 70 are arranged respectively inside the speed meter image 56 and the rotational speed meter image 60. At this time, the speed meter image 56 and the rotational speed meter image 60 (including the circular images 70) are displayed with the largest size (diameter) among the display formats, to be easily seen by the driver.

The speed meter image 56 and the rotational speed meter image 60 have their sizes slightly reduced and are each moved farther outward in the width direction, in accordance with the middle region 68 being widened in order to arrange the driving assistance image 76 in the transitional display format 52. The circular images 70 are also reduced in size and moved in accordance with the size reduction and movement of the speed meter image 56 and the rotational speed meter image 60. The in-vehicle display apparatus 10 reduces the discomfort felt by the driver, by smoothly displaying the change of these images over time.

The width-direction sides of the driving assistance image 76 displayed in the transitional display format 52 overlap with the speed meter image 56 and the rotational speed meter image 60 in the main display format 50. Due to this, the driver easily recognizes the driving assistance image 76.

Furthermore, upon transitioning to the driving assistance display format 54, the in-vehicle display apparatus 10 deletes the speed meter image 56 and the rotational speed meter image 60. Due to this, in the driving assistance mode, the amount of information concerning the drive force of the vehicle 12 provided to the driver is reduced, and it is possible to reduce the situations where the driver would feel annoyed.

In the driving assistance display format 54, the pair of circular images 70 move farther outward in the width direction of the display screen 14*a*, accompanying the deletion of the speed meter image 56 and the rotational speed meter image 60. Therefore, in the driving assistance display format 54, the middle region 68 becomes even wider. The width-direction sides of the driving assistance image 76 in the driving assistance display format 54 then partly overlap with the speed meter image 56 and the rotational speed meter image 60 in the transitional display format 52, thereby becoming easier to see. It should be noted that, even when the driving assistance image 76 is switched from the transitional display format 52 to the driving assistance display format 54, the sizes and positions of the schematic lane lines 77, the schematic user vehicle 78, and the schematic other vehicle 79 do not change, and only the background grid is widened.

The following describes the change of the speed limit image 64 that accompanies the transition of the display format. In the main display format 50, the speed limit image 64 is arranged close to and below the speed numerical value image 66, which is arranged on the top side of the middle region 68. The speed numerical value image 66 is set such that the size and position thereof does not change among the plurality of display formats (the main display format 50, the transitional display format 52, and the driving assistance display format 54).

In the transitional display format 52, the speed limit image 64 has its size slightly reduced and moves to a position near a side (left side) of the speed numerical value image 66. At this time, the in-vehicle display apparatus 10 may smoothly display the change of the speed limit image 64 over time. Furthermore, the upper limit value image 80 is arranged at a side across the speed numerical value image 66 from the speed limit image 64.

The in-vehicle display apparatus 10 causes the arrangement positions of the speed limit image 64, the speed numerical value image 66, and the upper limit value image 80 to remain the same, even when a switch is made from the transitional display format 52 to the driving assistance display format 54. Due to this, the in-vehicle display apparatus 10 can provide the driver with various types of information concerning the speed, in a stable manner allowing for easy comparison.

The present invention is not limited to the above-described embodiments, and various alterations could be adopted therein without departing from the scope of the present invention. For example, the speed meter image 56 and the rotational speed meter image 60 in the main display format 50 or the transitional display format 52 are not limited to analog displays that simulate meters. As an example, the speed meter image 56 may be an image in which the speed indicator 57 may be arranged along the horizontal direction or vertical direction (or a diagonal direction) of the display screen 14a, and a parameter (e.g., the number of displayed blocks indicating the physical quantity) increases or decreases in the extension direction of the speed indicator 57 in accordance with the speed change of the vehicle 12.

Furthermore, when transitioning from the driving manipulation mode to the driving assistance mode, the in-vehicle display apparatus 10 may be configured to omit the transitional display format 52 and transition from the main display format 50 (driving manipulation display format 48) to the driving assistance display format 54. At this time, the upper limit value image 80 indicating the upper limit value of the speed set in the transitional mode can be arranged on the bottom side of the speed limit image 64 in the driving manipulation display format 48, for example.

The following is a record of the technical concepts and effects that can be understood from the above embodiments.

One aspect of the present invention is an in-vehicle display apparatus 10 including a display device 14 and a control section (display control section 16) that causes information of a vehicle 12 to be displayed as an image in the display device 14, wherein the vehicle 12 is configured to switch between a driving manipulation mode, in which drive force of the vehicle 12 is controlled based on a driving manipulation made by a driver, and a driving assistance mode, in which driving assistance is implemented to automatically control the drive force of the vehicle 12; the control section, in the driving manipulation mode, causes display to be performed in a driving manipulation display format 48, in which one or more first images (speed meter image 56 and rotational speed meter image 60) that indicate a physical quantity accompanying the drive force of the vehicle 12 using an indicator and a parameter change with respect to the indicator are displayed; and the control section, in the driving assistance mode, causes display to be performed in a driving assistance display format 54, in which the first images are deleted and a second image (driving assistance image 76) concerning the driving assistance is displayed.

By, when in the driving assistance display format 54, deleting the first images (speed meter image 56 and rotational speed meter image 60), which are displayed in the driving manipulation display format 48 and displaying the second image (driving assistance image 76), the in-vehicle display apparatus 10 provides the driver with suitable information according to the mode. Due to this, the driver can easily recognize the implementation of the driving assistance mode, and annoyance felt by the driver is reduced since the first images are not seen in the driving assistance mode. Accordingly, the in-vehicle display apparatus 10 can improve the comfort and convenience for the user.

The vehicle 12 includes a mode switching portion 44 by which the driver performs a mode switching operation to transition from the driving manipulation mode to the driving assistance mode; the driving manipulation mode includes a main mode, in which the driver performs the driving manipulation without performing the mode switching operation, and a transitional mode, which is a stage in which the mode switching operation has been performed but the vehicle has not yet transitioned to the driving assistance mode; the driving manipulation display format 48 of the main mode is a main display format 50, in which two types of the first images (speed meter image 56 and rotational speed meter image 60) are displayed next to each other; and the driving manipulation display format 48 of the transitional mode is a transitional display format 52, in which the two types of first images are moved away from each other and the second image (driving assistance image 76) is displayed between the two types of first images that have been moved away from each other. Due to this, the in-vehicle display apparatus 10 displays the information needed for driving assistance, between the two types of first images, in the stage of transitioning from the driving manipulation mode to the driving assistance mode, thereby making it easy for the user to recognize the transitional stage and further improving the convenience for the user.

The two types of first images are a speed meter image 56, in which speed of the vehicle 12 is displayed in an analog manner, and a rotational speed meter image 60, in which rotational speed of a drive source of the vehicle 12 is displayed in an analog manner. Due to this, the in-vehicle display apparatus 10 can provide the speed of the vehicle 12 and the rotational speed of the drive source in a format that the user is used to seeing.

In the main display format 50, a third image (speed limit image 64) is displayed in a middle region 68 set between the two types of first images (speed meter image 56 and rotational speed meter image 60); and, in the transitional display format 52, the third image is moved to and displayed in a region other than the middle region 68 and the second image (driving assistance image 76) is displayed overlapping the middle region 68 of the main display format 50. Due to this, the in-vehicle display apparatus 10 can effectively use the display screen 14a of the display device 14 in the transitional display format 52 to more reliably provide the user with the necessary information.

The third image is a sign image 65 (speed limit image 64) indicating a sign of a road on which the vehicle 12 is currently travelling. By providing the user with the speed limit information in this way, the in-vehicle display apparatus 10 can further improve the convenience.

The two types of first images (speed meter image 56 and rotational speed meter image 60) in the transitional display format 52 are reduced in size, compared to the two types of first images in the main display format 50. Due to this, the in-vehicle display apparatus 10 can display the second image (driving assistance image 76), which is arranged between the pair of first images, to be larger in the transitional display format 52, thereby making it possible for the user to more reliably recognize the transition to the driving assistance mode.

A display position of the first image (speed meter image 56 and rotational speed meter image 60) in the driving manipulation display format 48 partially overlaps a display position of the second image (driving assistance image 76) in the driving assistance display format 54. Due to this, the in-vehicle display apparatus 10 can display the second image to be larger in the driving assistance mode, thereby making it possible for the user to stably recognize the information needed for the driving assistance mode.

In the driving manipulation display format 48 and the driving assistance display format 54, speed numerical value images 66, which indicate a numerical value of speed of the vehicle 12, are arranged at the same position as each other. Due to this, the in-vehicle display apparatus 10 can notify the user of the current detailed speed of the vehicle 12.

In the driving assistance display format 54, an upper limit value image 80, which shows an upper limit value of the speed of the vehicle 12 in the driving assistance mode, is placed at a position near and lateral to the speed numerical value image 66. Due to this, in the in-vehicle display apparatus 10, the user can smoothly set the upper limit value of the speed, which is set in the driving assistance mode, while comparing the upper limit value to the current speed.

In the driving manipulation display format 48, a circular image 70, which indicates information of the vehicle 12, is arranged inside the first image (speed meter image 56 and rotational speed meter image 60) that forms an arc shape; and the circular image 70 remains to be displayed even when the first image is deleted in the driving assistance display format 54. Due to this, the user can favorably recognize the information of the vehicle 12 that is suitable when the driving assistance mode is implemented.

What is claimed is:

1. An in-vehicle display apparatus comprising a display device and a control section that causes information of a vehicle to be displayed as an image in the display device, wherein: the vehicle is configured to switch between a driving manipulation mode, in which drive force of the vehicle is controlled based on a driving manipulation made by a driver, and a driving assistance mode, in which driving assistance is implemented to automatically control the drive force of the vehicle; the control section includes one or more processors; and the one or more processors: in the driving manipulation mode, cause display to be performed in a driving manipulation display format, in which one or more first images that indicate a physical quantity accompanying the drive force of the vehicle using an indicator and a parameter change with respect to the indicator are displayed; and in the driving assistance mode, cause display to be performed in a driving assistance display format, in which the first images are deleted and a second image concerning the driving assistance is displayed, wherein the first images comprise an arc-shaped circumferential-direction indicator line, a scale formed on the arc-shaped circumferential-direction indicator line, and an indicator needle configured to move along the arc-shaped circumferential-direction indicator line in response to the parameter change, and wherein in the driving assistance display format, an entirety of the arc-shaped circumferential-direction indicator line, the scale, and the indicator needle of the first images are hidden.

2. The in-vehicle display apparatus according to claim 1, wherein:
the vehicle includes a mode switching portion by which the driver performs a mode switching operation to transition from the driving manipulation mode to the driving assistance mode;
the driving manipulation mode includes a main mode, in which the driver performs the driving manipulation without performing the mode switching operation, and a transitional mode, which is a stage in which the mode switching operation has been performed but the vehicle has not yet transitioned to the driving assistance mode;
the driving manipulation display format of the main mode is a main display format, in which two types of the first images are displayed next to each other; and
the driving manipulation display format of the transitional mode is a transitional display format, in which the two types of first images are moved away from each other and the second image is displayed between the two types of first images that have been moved away from each other.

3. The in-vehicle display apparatus according to claim 2, wherein:
the two types of first images are a speed meter image, in which speed of the vehicle is displayed in an analog manner, and a rotational speed meter image, in which rotational speed of a drive source of the vehicle is displayed in an analog manner.

4. The in-vehicle display apparatus according to claim 2, wherein:
in the main display format, a third image is displayed in a middle region set between the two types of first images; and
in the transitional display format, the third image is moved to and displayed in a region other than the middle region and the second image is displayed overlapping the middle region of the main display format.

5. The in-vehicle display apparatus according to claim 4, wherein:
the third image is a sign image indicating a sign of a road on which the vehicle is currently travelling.

6. The in-vehicle display apparatus according to claim 2, wherein:
the two types of first images in the transitional display format are reduced in size, compared to the two types of first images in the main display format.

7. The in-vehicle display apparatus according to claim 1, wherein:
a display position of the first image in the driving manipulation display format partially overlaps a display position of the second image in the driving assistance display format.

8. The in-vehicle display apparatus according to claim 1, wherein:
in the driving manipulation display format and the driving assistance display format, speed numerical value images, which indicate a numerical value of speed of the vehicle, are arranged at a same position as each other.

9. The in-vehicle display apparatus according to claim 8, wherein:
in the driving assistance display format, an upper limit value image, which shows an upper limit value of the speed of the vehicle in the driving assistance mode, is placed at a position near and lateral to the speed numerical value image.

10. The in-vehicle display apparatus according to claim 1, wherein:

in the driving manipulation display format, a circular image, which indicates information of the vehicle, is arranged inside the first image that forms an arc shape; and the circular image remains to be displayed even when the first image is deleted in the driving assistance display format.

* * * * *